(12) United States Patent
Chaudhry et al.

(10) Patent No.: US 10,373,301 B2
(45) Date of Patent: Aug. 6, 2019

(54) STRUCTURAL HOT SPOT AND CRITICAL LOCATION MONITORING SYSTEM AND METHOD

(71) Applicant: Sikorsky Aircraft Corporation, Stratford, CT (US)

(72) Inventors: Zaffir A. Chaudhry, S. Glastonbury, CT (US); Alan Matthew Finn, Hebron, CT (US); Ziyou Xiong, Wethersfield, CT (US); Hongcheng Wang, Farmington, CT (US); Patrick Louis Clavette, Simsbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 213 days.

(21) Appl. No.: 14/036,308

(22) Filed: Sep. 25, 2013

(65) Prior Publication Data

US 2015/0086083 A1 Mar. 26, 2015

(51) Int. Cl.
*G01N 27/82* (2006.01)
*G06T 7/00* (2017.01)

(52) U.S. Cl.
CPC .. *G06T 7/0004* (2013.01); *G06T 2207/30164* (2013.01)

(58) Field of Classification Search
CPC ............. G06F 17/30056; G06T 7/0004; G06T 2207/30164
USPC .................................................. 715/203, 838
See application file for complete search history.

(56) References Cited

U.S. PATENT DOCUMENTS

| | | | | |
|---|---|---|---|---|
| 4,680,470 A | | 7/1987 | Heald | |
| 4,752,140 A | * | 6/1988 | Cielo | G01N 25/72 356/484 |
| 5,087,822 A | * | 2/1992 | Fairlie | G01N 21/8903 250/559.16 |
| 5,257,088 A | * | 10/1993 | Tyson, II | G01B 11/161 244/125 |
| 5,339,152 A | * | 8/1994 | Horn | G01B 11/164 356/458 |
| 5,481,356 A | * | 1/1996 | Pouet | G01B 11/162 356/35.5 |
| 5,764,363 A | * | 6/1998 | Ooki | G01B 11/0608 356/364 |

(Continued)

OTHER PUBLICATIONS

Jindřich Finda, Andrew Vechart and Radek Hédl, Prediction of Fatigue Crack Growth in Airframe Structures, Jun. 6, 2012, Honeywell International Inc., 1985 Douglas Drive North (M/S MN10-112B), Golden Valley, MN 55422, USA, all pages.*

(Continued)

*Primary Examiner* — Scott T Baderman
*Assistant Examiner* — Hassan Mrabi
(74) *Attorney, Agent, or Firm* — Cantor Colburn LLP

(57) ABSTRACT

A method for detecting a crack in a structural component includes receiving, with a processor, signals indicative of at least one image for a critical location in the structural component; determining, with the processor, at least one shape in the at least one image, the at least one shape being representative of a structure of the critical location; representing, with the processor, at least one region around the structure into a matrix; and applying, with the processor, image processing on the matrix to detect cracks in the at least one region of the structural component.

16 Claims, 2 Drawing Sheets

(56) References Cited

U.S. PATENT DOCUMENTS

| | | | |
|---|---|---|---|
| 6,226,080 B1* | 5/2001 | Takeuchi | G01N 21/958 356/239.1 |
| 6,643,002 B2* | 11/2003 | Drake, Jr. | G01N 29/04 356/72 |
| 6,730,912 B2 | 5/2004 | Sun et al. | |
| 6,849,972 B1 | 2/2005 | Barnes et al. | |
| 7,209,539 B2* | 4/2007 | De Smet | G01N 23/04 378/112 |
| 7,272,254 B2 | 9/2007 | Shankarappa et al. | |
| 7,447,598 B2 | 11/2008 | Malkin et al. | |
| 7,738,730 B2 | 6/2010 | Hawley | |
| 8,255,170 B2 | 8/2012 | Kollgaard et al. | |
| 9,488,592 B1 | 11/2016 | Maresca et al. | |
| 2004/0064269 A1* | 4/2004 | Shibuya et al. | 702/40 |
| 2005/0264813 A1* | 12/2005 | Giakos | B82Y 20/00 356/369 |
| 2007/0223557 A1* | 9/2007 | Pevzner | G01N 25/72 374/5 |
| 2009/0182528 A1* | 7/2009 | De Groot | G01B 11/06 702/167 |
| 2009/0284593 A1* | 11/2009 | Dubois | G01B 11/2518 348/135 |
| 2009/0287450 A1* | 11/2009 | Dubois | G01B 11/2518 702/152 |
| 2009/0309762 A1* | 12/2009 | Wolcken et al. | 340/945 |
| 2010/0013468 A1* | 1/2010 | Joubert | G01N 27/90 324/240 |
| 2010/0244834 A1 | 9/2010 | Mori et al. | |
| 2011/0235894 A1 | 9/2011 | Bookout et al. | |
| 2012/0131309 A1 | 5/2012 | Johnson | |
| 2013/0261876 A1 | 10/2013 | Froom et al. | |
| 2013/0289943 A1 | 10/2013 | Sharp et al. | |
| 2013/0329011 A1 | 12/2013 | Lee et al. | |
| 2014/0001076 A1* | 1/2014 | Fadeev et al. | 206/524.3 |
| 2014/0114563 A1 | 4/2014 | Newson et al. | |
| 2014/0184786 A1 | 7/2014 | Georgeson et al. | |
| 2016/0284018 A1 | 9/2016 | Adeyoola et al. | |
| 2017/0124781 A1 | 5/2017 | Douillard et al. | |
| 2017/0248963 A1 | 8/2017 | Levinson et al. | |
| 2018/0114092 A1 | 4/2018 | Huang et al. | |
| 2018/0276810 A1 | 9/2018 | Wang | |

OTHER PUBLICATIONS

International Search Report for application PCT/US14/57194, dated Dec. 16, 2014, 8 pages.
Written Opinion for application PCT/US14/57194, dated Dec. 16, 2014, 6 pages.
B. Shahraray et al., Defect detection, classification and quantification in optical fiber connectors, in (IAPR Workshop on Machine Vision Applications), pp. 1-22, 1990. 2.
D.G. Lowe, Object recognition from local scale-invariant features, in (Proceedings of the International Conference on Computer Vision), 1993.3 p. 1150-1157
D.W. Heoppner, Federal Aviation Administration, (The role of fretting fatigue on aircraft rivet hole cracking). Office of Aviation Research, 1996. 3.
E. Candes et al., Robust principal component analysis? (Journal of the ACM), May 2011. 2, 4 58 (3).
H. Nguyen et al., Crack image extraction using a radial basis functions based level set interpolation technique. (In ICESEE), 2012.2 pp. 118-122.
J. Lllingworth et al., Survey of the hough transform. (Computer Vision, Graphics, and Image Processing, 44(1):87-116, 1988 2.
M. Seigel et al., Enhanced remote visual inspection of aircraft skin. In Intelligent NDE Sciences for Aging and Futuristic Aircraft), 2, 4 1997.
Jahanshahi et al., An innovative methodolgy for detection and quantification of crack through incorporation of depth (Machine Vision and Applications, Feb. 2013, 2 2 (2):227-241.
P. Gunatilake et al., Image understanding algorithms for remote visual inspection of aircraft surfaces. (In Machine Vision Applications in Industrial Inspection V,) Feb. 1997. 2,4 pp. 2-13 vol. 3029.
R. Mumtaz et al., Computer aided visual inspection of aircraft surfaces. (International Journal of Image Processing) (IJIP), 6(1):38-553, 2012. 2.
R.O. Gordon, 43-204—Visual Inspection for Aircraft. AFS-350, U.S. Department of Transportation, 1997.1.
S. Chambon et al., Automatic road pavement assessment with image processing: Review and comparison. (International Journal of Geophysics), 2011.2 pp. 1-28.
T.M. Strat, Employing contextual information in computer vision. (In ARPA Image Understanding Workshop), 1993. 2.
Z. Lin et al., The augmated lagrange multiplier method for exact recovery of corrupted low-rank matrices.( UIUC Technical Report) UILU-ENG-09-2214, 2010.5.
Z. Zhang, A. et al., Tilt: Transform invariant low-rank textures. (International Journal of Computer Vision) (IJCV), 99(1):-24, 2012.
EP Extended European Search Report; Communication; Application No. 14849153.3-1906/3049793 PCT/US2014057194; dated May 29, 2017, pp. 1-10.
Hongcheng Wang, et al., "A Context-Driven Approach to Image-Based Crack Detection," Machine Vision and Applications, Oct. 2016, vol. 27, Issue 7, pp. 1103-1114.
National Research Council Canada, [online]; [retrieved on Jul. 6, 2017]; retrived from the Internet NRCC, "Department Performance Report (DRP) Dec. 2011 Quick Links," NRC Government of Canada, pp. 1-32. http://www.nrc-cnrc.gc.ca/eng/reports/2011_2012/dpr_2012/dpr_supplementary.html.
Notification of Transmittal of the International Search Report for International Application No. PCT/US16/12959; International Filing Date: Jan. 12, 2016; dated Mar. 28, 2016; 11 pages.
P.S. Huang, et al., "Quantitative Evauliation of Corrosion by a Digital Fringe Projection Technique," Optics and Lasers in Engineering 31 (1999) pp. 371-380.
Q. Zou, et al., "CrackTree: Automatic Crack Detection from Pavement Images," Pattern Recognition Letters, 33 (2012), pp. 227-238.
R. Osegueda, "(U)(HBCU/MI) Workshop on Intelligent NDE Sciencies for Aging and Futuristic Aircraft," Fast Center for Structural Integrity of Aerospace Systems, Mar. 1998, pp. 1-310 (in three parts).
Written Opinion of the International Searching Authority for International Application No. PCT/US16/12959; International Filing Date: Jan. 12, 2016; dated Mar. 28, 2016; 5 pages.
X. Wang, "Automated Crack Detection for Digital Radiography Aircraft Wing Inspection," Research in Nondestructive Evaluation, Mar. 24, 2011, pp. 1-24.
PCT, International Preliminary Report on Patentability, International Application No. PCT/US2016/012959; International Filing Date: Jan. 12, 2016; dated Jul. 18, 2017; pp. 1-6.
PCT International Preliminary Report on Patentability; International Application No. PCT/US2014/057194; International Filing Date: Sep. 24, 2014; dated Mar. 29, 2016; pp. 1-7.
Extended European Serach Report issued in Application No. 16737696 dated Jun. 6, 2018, 11 pages.
John C. Aldrin, "Overview of Mathematical Modeling in Nondestructive Evaluation (NDE)", Sep. 1, 2002, 41 pages.
N. Brierley et al., "Data fusion for automated non-destructive inspection" Proceedings of the Royal Society, vol. 470, No. 2167, May 14, 2014, 25 pages.

* cited by examiner

STRUCTURAL HOT SPOT AND CRITICAL LOCATION MONITORING SYSTEM AND METHOD

BACKGROUND

The subject matter disclosed herein relates generally to the field of non-destructive inspection and, more particularly, to a structural hot spot and critical location monitoring system and method.

DESCRIPTION OF RELATED ART

Non-destructive inspection (NDI) has been used in the aerospace industry for detecting aircraft surface and subsurface defects. Typical defects in aircraft structures include cracks, corrosion, and disbonding. Visual inspection (such as by a person) has been widely used for detecting cracks in aircraft structures as it is often an economical and quick method to gauge a condition of the aircraft structure (notwithstanding the questionable reliability of human inspection). Cracks typically appear in areas that experience fatigue such as, for example, in holes for rivets, bolts, etc. These areas, commonly referred to as "hot spots" may be located in certain inaccessible areas of the aircraft, for example hidden behind other structures or panels, and may not be amenable to visual inspection. These hot spots may be manually inspected by remote imaging methods, e.g., utilizing a borescope, and include preferential inspection of analytically predicted hot spot locations. However, these manual image-based methods can be cumbersome and are used in limited circumstances. An improved system and method for structural hot spot and critical location monitoring may be well received in the field.

BRIEF SUMMARY

According to an aspect of the invention, a method for detecting a crack in a structural component includes receiving, with a processor, signals indicative of at least one image for a critical location in the structural component; determining, with the processor, at least one shape in the at least one image, the at least one shape being representative of a structure of the critical location; representing, with the processor, at least one region around the structure into a matrix; and applying, with the processor, image processing on the matrix to detect cracks in the at least one region of the structural component.

According to another aspect of the invention, a system for detecting a crack in a critical location of a structural component includes an image processing computer including a processor and memory; a camera that receives signals indicative of at least one image for the critical location, where the memory includes instructions stored thereon that, when executed by the processor, cause the system to: determine at least one shape in the at least one image, the at least one shape being representative of a structure of the critical location; represent at least one region around the structure into a matrix; and apply image processing on the matrix to detect cracks in the at least one region of the structural component.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
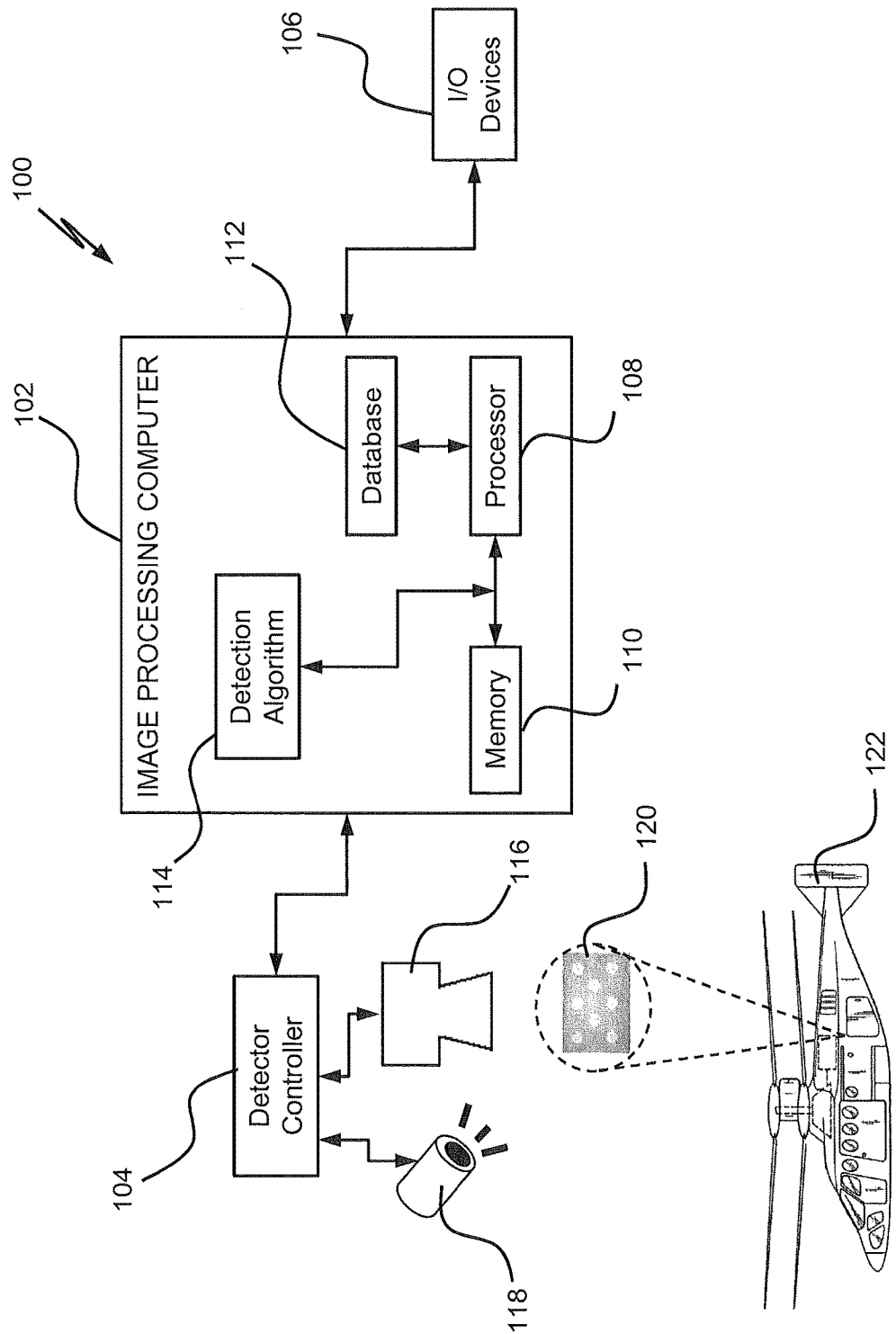
FIG. 1 is a schematic view of an exemplary computing system according to an embodiment of the invention.

Referring to the drawings, FIG. 1 illustrates a schematic block diagram of a structural hot spot and critical location monitoring system 100 (hereinafter "structural monitoring system 100") according to an embodiment of the invention. The structural monitoring system 100 includes a crack detection and monitoring algorithm 114 (hereinafter "detection algorithm 114") for detecting cracks or hot spots in a structural component 120 in, for example, a rotary-wing aircraft 122.

As illustrated, the structural monitoring system 100 includes an image processing computer 102, a detector controller 104, and input/output (I/O) devices 106. The image processing computer 102 may be implemented as a workstation, such as a PC or a server. The image processing computer 102 includes a memory 110 that communicates with a processor 108. The memory 110 may store a detection algorithm 114 as executable instructions that are executed by the processor 108. The executable instructions may be stored or organized in any manner and at any level of abstraction, such as in connection with the execution of the detection algorithm 114. The processor 108 may be any type of processor (CPU), including a general purpose processor, a digital signal processor, a microcontroller, an application specific integrated circuit, a field programmable gate array, or the like. In an embodiment, the processor 108 may include an image processor in order to process, through the use of additional processing algorithms, video and/or still image data that are captured by camera 116. Also, in embodiments, memory 110 may include random access memory (RAM), read only memory (ROM), or other electronic, optical, magnetic, or any other computer readable medium onto which is stored the detection algorithm 114 described below. The image processing computer 102 may include a database 112 in data communication with the processor 108. The database 112 may be used to store image and video data of structural component 120 of, for example, a rotary-wing aircraft 122 as well as any other data and algorithms that is used to implement the detection algorithm 114. Although this invention has been disclosed in embodiments as being applied to a rotary-wing aircraft 122, it is to be appreciated that the embodiments described herein may be applied to other vehicles or structures for which defect identification is being determined.

Also illustrated, structural monitoring system 100 includes a detector controller 104 in two-way communication with the image processing computer 102. The detector controller 104 is in data communication with, for example, a plurality of light emitting diodes (LEDs) 118 and camera 116 over a wired or wireless connection. In an embodiment, camera 116 may be a two-dimensional (2D) or three-dimensional (3D) camera with a built-in plurality of LEDs 118 and detector controller 104 but, in other embodiments, the camera 116 may be remote from detector controller 104 and the plurality of LEDs 118, or a combination thereof. In a non-limiting example, camera 116 is a three color RGB camera with a 120 degree field of view and may include a plurality of LEDs built into its housing, may include a resolution of 1 millimeter at 3 meters, may include a range of 2 centimeters to 3 meters, may include on-board image processing to interface with detector controller 104 or directly with image processing computer 102, and may include wireless capability to transmit input images to a remote processor. In one example, the remote processor may be processor 108. Also, a polarizer may be coupled to camera 116 in order to remove specular reflections from camera images received by camera 116. In embodiments, an infrared camera coupled to an infrared illuminator, or other detector may be used in combination with camera 116 or in lieu of camera 116.

Also illustrated, detector controller 104 may include its own memory and processor that respectively store and process instructions for, in some examples, controlling the positioning and modulation of a light beam directed from a plurality of LEDs 118. Each of the plurality of LEDs 118 may be coupled to a polarizer in order to remove specular reflections in the image data from a critical location on a surface of the structural component 120 being illuminated. In an embodiment, each plurality of LEDs 118 may be directed by detector controller 104 to be selectively turned ON and illuminate a critical location of structural component 120 while camera 116 is capturing an image or video of the critical location. Alternatively, the plurality of LEDs 118 may be selectively and remotely controlled by image processing computer 102 through direction by a user via wired or wireless signals sent from image processing computer 102 or I/O devices 106. In an embodiment, the plurality of LEDs 118 may be placed substantially around rivet locations of interest to provide directional illumination, and obtain a set of images manually through user input or by the application of detection algorithm 114. In an embodiment, the LEDs 118 may be modulated so that one or more of the plurality of LEDs 118 may be individually and selectively turned ON. In this way, the system may provide for capturing optimal images for processing. The processor on detector controller 104 may be any type of processor (CPU), including a graphics processing unit (GPU), a general purpose processor, a digital signal processor, a microcontroller, an application specific integrated circuit, a field programmable gate array, or the like. Also, memory on detector controller 104 may include random access memory (RAM), read only memory (ROM), or other storage such as an electronic, an optical, a magnetic, or any other computer readable medium. It is to be appreciated that the detection algorithm 114 may also be utilized for detecting cracks in critical locations utilizing other fasteners besides rivets.

Image processing computer 102 may provide one or more directives to detector controller 104 such as, for example, positioning the plurality of LEDs 118, turning ON the plurality of LEDs 118, or changing a direction of the plurality of LEDs 118 in response to camera image data that is acquired by camera 116 for structural component 120. Directives provided by the image processing computer 102 may be received from one or more input/output (I/O) devices 106. The I/O devices 106 may include a display device or screen, audio speakers, a graphical user interface (GUI), keyboard, microphone for voice recognition, etc. In some embodiments, the I/O devices 106 may be used to enter or adjust a linking between data or sets of data.

It is to be appreciated that structural monitoring system 100 is illustrative. In some embodiments, additional components or entities not shown in FIG. 1 may be included. In some embodiments, one or more of the components or entities may be optional. In some embodiments, the components or entities of structural monitoring system 100 may be arranged or configured differently from what is shown in FIG. 1. For example, in some embodiments, the detector controller 104 may be commanded by I/O device 106, as opposed to being commanded by processor 108 or image processing computer 102 as shown in FIG. 1.

Figure 2:
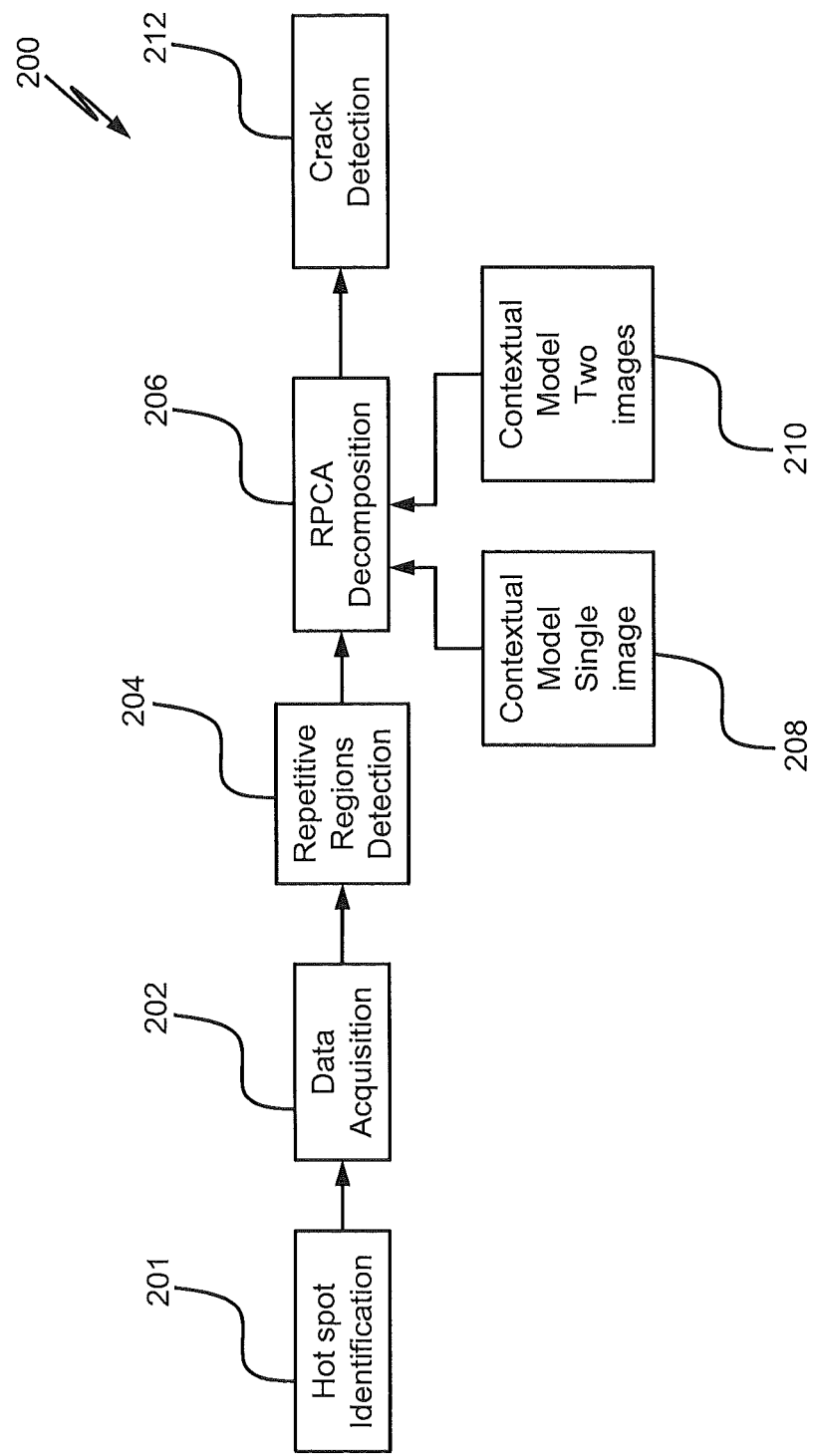
FIG. 2 illustrates a dataflow diagram for detection algorithm according to an embodiment of the invention.

FIG. 2 illustrates an exemplary data flow diagram 200 for the detection algorithm 114 that monitors and detects hot spot and critical locations in a structure according to an embodiment of the invention. With continued reference to FIG. 1, implementation of detection algorithm 114 begins with low-level image processing where, in block 201, a critical location of a structural component being monitored is identified or determined. In an embodiment, identification or determination of a critical location may be done before emplacing camera 116, LEDs 118, or Detector Controller 104. A critical location may be identified based on analytical modeling, experiential information, as well as historical information on the occurrence of hot spots and is generally associated with rivet or other fastener locations. Through experience and analysis, it has been determined that structural areas that have load transfer from one structural member to another structural member experience metal fatigue and display hot spots or cracks over time. These areas may include critical locations with repetitive shapes such as, for example, one or more rivets or other locations with repetitive shapes. As such, cracks are most likely to occur around rivets at these critical locations that have one or more rivets, e.g., in a gusset plate and, accordingly, detection algorithm 114 may be programmed to direct camera 116 to target these locations. As such, camera 116 may be programmed to identify, in an embodiment, repetitive rivets or other fasteners or alternatively, be programmed a particular coordinate location on the structural component 120 based prior knowledge of the structural component 120.

Next, in block 202, one or more camera images are obtained. Particularly, signals indicative for at least one camera image for a critical location are received by camera 116. In an embodiment, camera 116 may take a still camera image or a video image at a requisite time or interval for the critical location. In an embodiment, a critical location may represent at least one image of one or multiple rivets or other fasteners acquired through the wide field of view camera 116. The at least one camera image for the rivets is received by detector controller 104 which transmits the camera image to image processing computer 102 for analysis (i.e., crack detection or structural deformation) in the critical location. In an embodiment, crack detection may be detected from a single or multiple camera images or, alternatively, by reference of a camera image to a previous camera image or images of the same critical location (i.e., reference to historical camera image or images). In an embodiment, camera 116 may be panned to capture multiple images or a video of a wider monitoring area. The acquired images may be directly used for crack detection, or alternatively, initially stitched to generate a panoramic image before transmitting the panoramic image to the image processing computer 102 for analysis.

Signals indicative of the camera image are received by image processing computer 102 for implementation of block 204. In block 204, camera images are processed by processor 102 in order to detect rivets or other fastener in the received images. The camera image is processed by implementing a Hough Transform (HT) based algorithm for shapes in the image for one or more rivets or fasteners such as, for example, circles detection of one rivet or multiple rivets or fasteners. In an embodiment, the Hough Transform algorithm is applied according to the method disclosed in a non-patent literature publication authored by J. Illingworth and J. Kittler entitled "Survey of the hough transform" (*Computer Vision, Graphics, and Image Processing*, 44(1): 87-116, 1988) which is herein incorporated by reference. In an embodiment, if an optical axis of camera 116 is not perpendicular to a surface structural component 120 at the critical location, a Transform Invariant Low-rank Textures (TILT) algorithm is applied to transform the input image to an orthogonal perspective to the optical axis of camera 116 before applying the HT based algorithm in order to capture geometrically meaningful structures in the camera image. In an embodiment, the TILT algorithm is applied according to the method disclosed in a non-patent literature publication authored by Z. Zhang, A. Ganesh, X. Liang, and Y. Ma entitled "Tilt: Transform invariant low-rank textures" (*International Journal of Computer Vision (IJCV)*, 99(1):1-24, 2012) which is herein incorporated by reference. After the multiple rivets are detected, the regions around each rivet may be cropped, producing sub-images, and represented in a large input matrix.

Next, a high-level context driven model (or contextual model) is implemented into the analysis. The context driven model approach may be applied to a single camera image or sub-image, or to two camera images or sub-images. In block 208, a contextual model is incorporated on the matrix for a single camera image. The contextual model may be based on Geometric Layout Context and Physical Context that includes Force Context and Fretting Context. In Geometric Layout Context, prior knowledge representing contextual information that is around the critical location is estimated and incorporated into the input matrix in order to robustly detect cracks and reject false detections. Geometric Layout Context uses information that is around the multiple rivets or other fastener for crack reasoning such as, for example, how the structural component is connected (e.g. by rivets or other fastener), the shape of rivets or other fastener, the number of rivets or other fastener, the layout of rivets or other fastener, the relative distance among rivets or other fastener, and the like. The Geometric Layout Context information may provide information on how cracks will propagate. As there are repetitive rivets around a critical location, they have the same geometric structure and their appearance has similar visual properties. The geometric layout context provides a model for a normal appearance of a rivet or other fastener. The processed matrix is provided as signals to block 206 in order to perform a Robust Principle Component Analysis (RPCA).

Also, a Physical Context model for detecting a crack in a single camera image is applied. Physical Context denotes an effect of physical phenomena, such as the direction of the external force applied to the structural component or the fretting that may be associated with crack occurrence. Physical Context which includes Force Context and Fretting Context is independent of any geometric information about the structural component or any particular set of image acquisition conditions. Force Context is preferentially included when the additional information it provides about preferential crack propagation would improve the probability of early or correct detection. Force Context denotes an effect of physical phenomena, such as the direction of an external force applied to the critical location. It is independent of any geometric information about the critical location or any particular set of image acquisition conditions. Particularly, in Force Context, a crack may initiate from around rivets, and a principal propagation direction of the crack is orthogonal to the principal direction of force exerted to the critical location. The force information is known prior to implementation of the Force Context model.

Also, the Physical Context model for detecting a crack in a single camera image may be based on a Fretting Context model. Fretting occurs between two surfaces having oscillatory relative motions of small amplitude and fretting fatigue caused as a result of fretting loading may cause an accelerated nucleation of cracks. Fretting Context usually occurs around rivets along the direction of force. The Fretting Context model predicts coefficient of friction characteristics within a fretted rivet or other fastener during the nucleation of a crack and a finite element method may be used to calculate the state of stress at the rivet location where fretting-nucleated cracks were observed. In an embodiment, the Fretting Context model may be applied according to the method disclosed in a non-patent literature publication authored by D. Heoppner, C. Elliot III, and M. Moesser entitled "The role of fretting fatigue on aircraft rivet hole cracking" (*Federal Aviation Administration, Office of Aviation Research*, 1996), which is herein incorporated by reference.

To implement the Geometric Layout and Force Contexts, a location based prior $p_l$ and an orientation based prior, $p_o$ is used. The priors $p_l$, $p_o$ are two-dimensional matrices and centered appropriately in image coordinates. The location based prior $p_l$ consists of a radial location based prior, $p_r$, and a directional location based prior, $p_d$. The radial location based prior represents that cracks are likely to occur around rivets or other fastener, and the directional location based prior $p_d$ represents that cracks are likely to occur in a horizontal area if the force is applied along the vertical direction. Also, a simple Gaussian-like distribution is used to represent the radial location based prior $p_r$ and an exponential distribution is used to represent the directional location based prior $p_d$. The location based prior $p_l$ is a product of the radial location based prior $p_r$ and the directional location based prior $p_d$ as is shown in Equations (1)-(3).

$$p_r = \exp(-|d_r - r|^2 / \sigma_r^2) \qquad (1)$$

$$p_d = \exp(-d_d^2 / \sigma_d^2) \qquad (2)$$

$$p_l = p_r * p_d \qquad (3)$$

where:
$d_r$ is the distance to the rivet center;
$d_d$ is a distance to the line orthogonal to the force direction;
r is a radius of the detected rivets;
$\sigma_r$ and $\sigma_d$ are the scale parameters.

The orientation based prior $p_o$ is applied to each line segment. Orientation of each line segment, "orientation", is an angle between a line segment and a crack direction (i.e., a direction which is orthogonal to a force direction). For example, if force is exerted vertically, any line segment with horizontal orientation has a higher probability to be a crack. Similarly, ignoring a normalizing constant, a Gaussian prior is defined according to Equations (4) and (5)

$$p_o = \{\exp(-(|orientation| - \alpha)^2 / \sigma_o^2)\} \text{ if } |orientation| > \alpha^o \qquad (4)$$

otherwise $$p_o = 1 \qquad (5)$$

where:
$\alpha$ is an expected angle.

If orientation is close to angle $\alpha$, the line segment is very likely to be a crack. As the orientation deviates from $\alpha$, the line segment is less likely to be a crack. Next, the information from single image contextual application is subjected to a decomposition methodology. So, information from block 208 is provided as signals to block 206 in order to perform a Robust Principle Component Analysis (RPCA).

Similarly, in block 210, a contextual model for crack detection in two camera images is performed on the matrix. Particularly, where there is a crack, a displacement d between any two neighboring rivets or other fasteners on the surface of the critical location will change. The magnitude and direction of the displacement d provides an important cue for occurrence of a crack or inelastic deformation. By matching the two camera images before and after metal fatigue with an image matching/registration algorithm based on image features such as, for example, a Scale-Invariant Feature Transform (or SIFT) algorithm, an estimated value for a displacement change δd between rivets may be determined and may indicate a crack or deformation. In an embodiment, the SIFT algorithm may be applied according to the method disclosed in a non-patent literature publication authored by D. G. Lowe entitled "Object recognition from local scale-invariant features" (*Proceedings of the International Conference on Computer Vision*, page 1150-1157, 1993).

In block 206, the image matrix and information from contextual models 208, 210 for detecting a crack may be decomposed using RPCA. RPCA may be used on a matrix of sub-images from one image or may be used on a matrix from multiple images. RPCA decomposes the matrix into a normal component and a sparse component. The normal component contains the information pertaining to the common, undamaged structure and the sparse component contains information pertaining to abnormal components which includes cracks or deformation. In an example, assume that a region around each rivet or other fastener has a dimension n×n. Each region is reformulated into a long vector with size $N=n^2$. These regions are stacked into a N×M matrix, $A=[a_1; a_2; \ldots; a_i; \ldots; a_M]$, where M is the number of rivets. Further, each rivet region is regularized by a location based prior and orientation based prior and is used to form a low-rank matrix $\tilde{A}$:

$$\tilde{A}=p_o*[p_1*a_1; p_1*a_2; \ldots; p_1*a_i \ldots; p_1*a_M] \quad (6)$$

Due to the repetitive property of rivets or other fasteners, the matrix $\tilde{A}$ is intrinsically low rank.

In block 206, a Principal Component Pursuit (PCP) algorithm is applied to decompose the matrix into a low-rank or normal matrix component, L, and a sparse matrix component, S. In an embodiment, the PCP algorithm may be applied according to the method disclosed in a non-patent literature publication authored by E. Candés, X. Li, Y. Ma, and J. Wright entitled "Robust principal component analysis?" (*Journal of the ACM*, 58(3), May 2011) which is herein incorporated by reference. The low-rank matrix component L denotes a "normal" appearance of the rivets, and the sparse matrix component S contains the cracks. The decomposition is formulated to minimize a weighted combination of a nuclear norm of the low rank component, L, and of the $l_1$ norm of the sparse component, S according to Equations (7) and (8)

$$\text{minimize } \|L\|_*+\lambda\|S\|_1 \quad (7)$$

$$\text{subject to } \tilde{A}=L+S \quad (8)$$

where:

$\|L\|_*$ denotes the nuclear norm of the matrix (i.e., sum of its singular values);

$\|S\|_1$ denotes the sum of the absolute values of matrix entries; and

λ is a parameter that balances rank and sparsity.

The problem is solved according to an Augmented Lagrange Multiplier (ALM) algorithm. In an embodiment, the ALM algorithm may be applied according to the method disclosed in a non-patent literature publication authored by Z. Lin, M. Chen, and Y. Ma entitled "The augmented lagrange multiplier method for exact recovery of corrupted low rank matrices" (*UIUC Technical Report UILU-ENG*-09-2214, 2010) which is herein incorporated by reference.

Next, cracks are detected in the sparse component in block 212 by application of a thresholding scheme to find the cracks. In an embodiment, the thresholding scheme may be based on an intensity of the sparse component, a size or a length of expected cracks. It is to be appreciated that data flow diagram 200 is illustrative and additional components or entities not shown in FIG. 2 may be included. In embodiments, one or more of the components or entities may be optional or the components or entities in data flow diagram 200 may be arranged or configured differently from what is shown in FIG. 2. For example Context Model 208 may include prior models different than the described location and force priors, and the RPCA Decomposition 206 and Crack Detection 212 might be replaced with different decomposition and/or detection algorithms.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for detecting cracks in a structural component, comprising:

applying a detection algorithm that includes a low level image processing and a high level image processing;

identifying, using the low level image processing algorithm, a critical location of a structural component by detecting repetitive shapes in an area of the structural component where load is transferred;

directing, by the detection algorithm, a camera toward the critical location in response to determining the critical location;

receiving, with a processor, signals indicative of at least one camera image for the critical location in the structural component, wherein the camera image of the critical location includes a location where metal fatigue of the structural component is likely to occur;

determining, with the processor, at least one shape in the at least one image, the at least one shape being representative of a structure of the critical location;

transmitting, with the processor, the camera image for analysis of the identified critical location based on analytical modeling, experiential information and historical information;

producing, with the processor, one or more images representing a large input matrix; wherein the images represents at least one region around the structure of the critical location in the matrix;

applying, with the high level image processing, a contextual high level driven model analysis on the matrix, wherein the contextual model includes steps of image processing on the matrix including performing a robust principle component analysis using an output from a contextual model applied to the matrix, to decompose the matrix into a normal component and a sparse component, the sparse component containing information pertaining to cracks or deformation of the structural component;

and applying a thresholding scheme, with the processor, to the sparse component to detect cracks in the at least one region of the structure of the critical location.

2. The method of claim 1, wherein the applying of the contextual model further comprises: applying at least one of a Geometric Layout Context model to the matrix, a Force Context model to the matrix, and a Fretting Context model to the matrix.

3. The method of claim 2, wherein the applying of the Geometric Layout Context model further comprises applying prior information related to an area around the critical location.

4. The method of claim 2, wherein the applying of the Force Context model further comprises: determining the crack in a direction orthogonal to an application of force.

5. The method of claim 2, wherein the applying of the Fretting Context model further comprises: predicting coefficient of friction characteristics within a rivet.

6. The method of claim 1, further comprising: determining a sparse component from the matrix, wherein the sparse component is representative of cracks in the structural component.

7. The method of claim 1, wherein the receiving of the signals indicative of the image further comprises: capturing with a camera two-dimensional or three-dimensional images of the structural component.

8. The method of claim 1, wherein the applying of the image processing further comprises: implementing at least one of a Hough transform algorithm or a Transform Invariant Low-rank Textures algorithm to the image.

9. The method of claim 1, wherein the applying of the contextual model further comprises at least one of: determining a change in a feature in the at least one image relative to historical information regarding the feature for the at least one image; determining an estimated value for a displacement change in the at least one image relative to a historical estimated value for the displacement change in the at least one image; or applying an image matching algorithm to the at least one image and historical information for the at least one image.

10. A system for detecting cracks in a critical location of a structural component, comprising:

an image processing computer including a processor and memory; and a camera that receives signals indicative of at least one image for the critical location;

apply a detection algorithm that includes a low level image processing and a high level image processing;

identify, using the low level image processing algorithm, a critical location of a structural component by detecting repetitive shapes in an area of the structural component where load is transferred;

direct, by the detection algorithm, a camera toward the critical location in response to determining the critical location;

receive, with a processor, signals indicative of at least one camera image for the critical location in the structural component, wherein the camera image of the critical location includes a location where metal fatigue of the structural component is likely to occur;

determine, with the processor, at least one shape in the at least one image, the at least one shape being representative of a structure of the critical location;

transmit, with the processor, the camera image for analysis of the identified critical location based on analytical modeling, experiential information and historical information;

produce, with the processor, one or more images representing a large input matrix; wherein the images represents at least one region around the structure of the critical location in the matrix;

apply, with the high level image processing, a contextual high level driven model analysis on the matrix, wherein the contextual model includes steps of image processing on the matrix including performing a robust principle component analysis using an output from a contextual model applied to the matrix, to decompose the matrix into a normal component and a sparse component, the sparse component containing information pertaining to cracks or deformation of the structural component;

and apply a thresholding scheme, with the processor, to the sparse component to detect cracks in the at least one region of the structure of the critical location.

11. The system of claim 10, wherein the system is configured to apply at least one of a Geometric Layout Context model to the matrix, a Force Context model to the matrix, and a Fretting Context model to the matrix.

12. The system of claim 10, wherein the system is configured to determine the crack in a direction orthogonal to an application of force in the Force Context model.

13. The system of claim 10, wherein the system is configured to determine a sparse component from the matrix, wherein the sparse component is representative of cracks in the structural component.

14. The system of claim 10, wherein the system is configured to capture with the camera two-dimensional or three-dimensional images of the structural component.

15. The system of claim 10, wherein the system is configured to implement at least one of a Hough transform algorithm or a Transform Invariant Low-rank Textures algorithm to the image.

16. The system of claim 10, wherein the system is configured for at least one of determine a change in a feature in the at least one image relative to historical information regarding the feature for the at least one image; determine an estimated value for a displacement change in the at least one image relative to a historical estimated value for the displacement change in the at least one image; or apply an image matching algorithm to the at least one image and historical information for the at least one image.

* * * * *